Patented Feb. 17, 1942

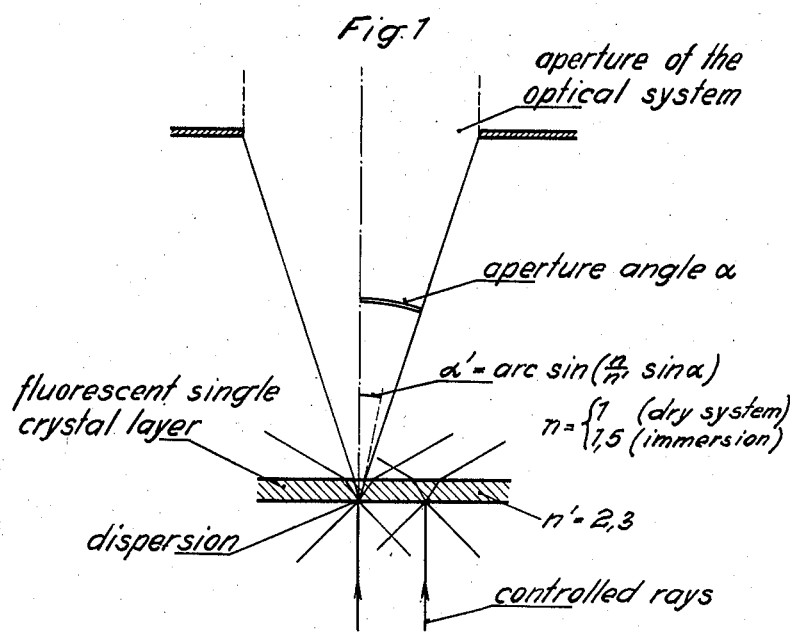

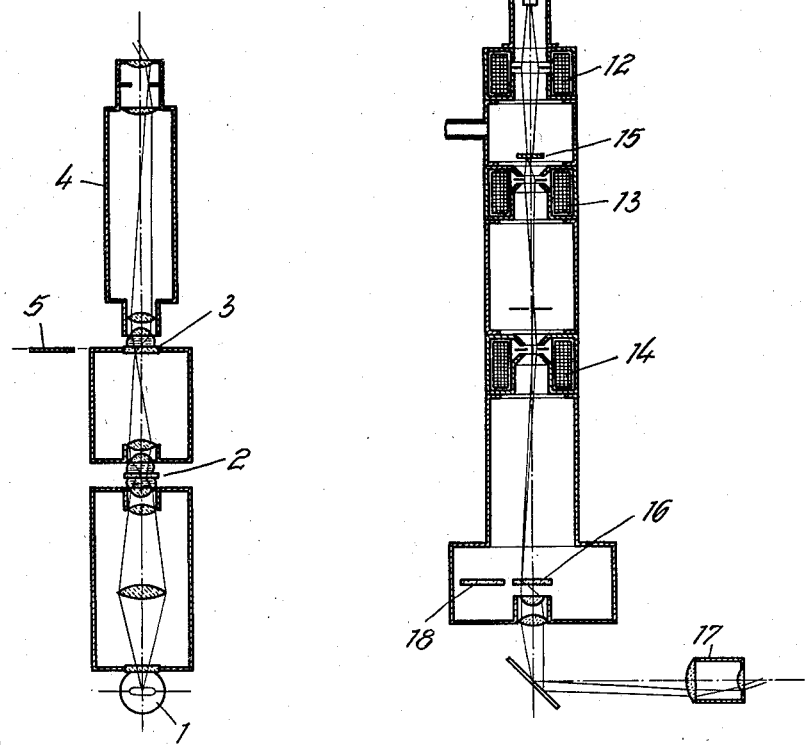

2,273,235

UNITED STATES PATENT OFFICE 2,273,235

ULTRAVIOLET OR ELECTRONIC MICROSCOPE

Manfred von Ardenne, Berlin-Lichterfelde, Germany

Application December 16, 1939, Serial No. 309,588
In Germany December 30, 1938

10 Claims. (Cl. 250—49.5)

This invention relates to improvements in ultraviolet or electronic microscopes.

It is known to effect the focusing of the image in ultraviolet or electronic microscopes with the aid of fluorescent screens observed by means of light-optical magnifying lenses or microscopes. The method hitherto employed presented, however, great difficulties. When observing the image with the aid of magnifying means, the fluorescent screen must be as grainless as possible. For this reason screens formed of uranium glass plates, single crystals consisting of an alkali chloride and containing an addition of highly refractory metal, or luminous screens of transparent organic substances have been used. These screens, however, have a very small efficiency both as regards illumination by electron rays and ultraviolet light. In contradistinction thereto the modern luminous screens formed of many single crystals present an efficiency greater than that of the above-mentioned screens by two to three orders of magnitude. However, these more efficient screens possess a coarse-grained structure so that the resolving power of these luminous screens cannot be reduced to more than about $\frac{1}{10}$ mm. If the size of the single crystals and therefore the grain size is reduced by using a suitable crystallization method or by a subsequent disintegration, the luminous intensity decreases very considerably. Hence, this method also fails to attain luminous screens having high resolving power as well as high efficiency.

In electronic microscopes of the usual type the image appearing on the fluorescent screen, which lies in the same plane as later the photographic plate when recording the image, is hardly perceivable when operating with extremely high magnification factors. The present trend to attaining still greater magnifications is apt to entail a further decrease in the intensity of the screen image. At all events, even at present, the conditions of intensity are such that the focusing by hand of the image appearing on the screen can only be effected with great difficulties so that a satisfactory visual observation of all details is by no means possible. In view of this situation, a good energetic efficacy of the luminous screen is obviously of great importance.

A great increase in the brilliance of the screen would not only make possible the construction of an electronic microscope with visual observation of all details of the object to be magnified, but would also permit utilizing weaker electron streams, i. e. to expose the objects to a weaker electronic emission.

The main objects of the present invention are to provide microscopes, operating with luminescent screens, which reduce or virtually eliminate the above drawbacks of the known devices or which present the advantage last mentioned. To this end the invention employs means to be presently described in conjunction with the embodiment exemplified in the accompanying drawings, in which Fig. 1 is of explanatory nature showing diagrammatically part of the beam path in a microscope of the type here in point, Figs. 2 and 3 show two different embodiments of microscopes according to the invention, each figure representing diagrammatically a longitudinal section along the electron-optical axis, while Fig. 4 is explanatory and shows a table of apertures.

As apparent from Fig. 1 and the aperture table of Fig. 4, an effective means for increasing the light density of a screen image to be observed with the eye, consists in producing an image too small for being observed with the naked eye and in observing the details of the small image with the aid of a light microscope. However, this method encountered difficulties, since owing to the granular structure of all known luminous screens of high efficiency the sharpness of the image was greatly impaired when reducing the size of the image.

According to the invention a tiny single crystal provided with optically clear surfaces i. e., a ground and polished single crystal of absolutely grainless structure, particularly of sphalerite, is employed as a luminous microscreen. Standard crystal screens of sphalerite now obtainable upon special order from manufacturers of such screens do not present, however, as practical tests have shown, any appreciable fluorescence. Therefore, according to the invention the microscreens are ground or cut from such synthetically made crystals whose chemical composition corresponds to the constituents of normal activated phosphides of zinc sulphide, or of normal phosphides of zinc cadmium sulphide. If desired, the surface of normal non-activated crystals of sphalerite may subsequently be rendered fluorescent by shooting the metal, for instance copper, from outside into the surface layer, for instance, by evaporating the metal under vacuum.

Fig. 2 exemplifies the use of the new fluorescent single crystal screen in an ultraviolet microscope. I denotes the ultraviolet light source, 2 is the object to be observed. 3 is a zinc sulphide single crystal screen on which the object is to be projected. The light microscope 4 serves to observe the image appearing on the screen 3. 5 is a photographic plate which replaces the fluorescent single crystal screen 3 when the image is to be photographically recorded.

Fig. 3 shows the invention as applied to an electronic microscope. II denotes the electron emitting source, I2 the condenser coil, I3 the objective and I4 the projection lens of the microscope. The object is arranged in the path of the beam as indicated at 15. At the lower end of the microscope is arranged the fluorescent single crystal screen 16 which may be viewed in the manner shown in the drawings with the aid of the light microscope 17. The light microscope serves to facilitate the focusing of the image produced on the fluorescent screen. 18 denotes the photographic plate. To photographically record an image the fluorescent single crystal screen 16 is removed by rotation from the path of ray and the photographic plate is substituted therefor.

Since the size of the single crystal screen is still very small, it is preferable to combine it when being used with a multi-crystal screen, i. e., to arrange it in the central portion of a multi-crystal screen. The latter then serves only to give an idea of the surface of the image not projected on the single crystal screen, but photographically recorded.

The light microscope serving to observe the object has a given depth of focus. Care must therefore be taken to see that the "thickness" of the luminous screen be adapted to the depth of focus of the observation microscope or vice versa in order that an optically unobjectionable image is distinctly visible in the observation microscope. The thickness of the image appearing on the luminous screen depends above all upon the depth of penetration of the ultraviolet rays or upon the depth to which the electrons penetrate the luminous crystal. For electrons impressed with a voltage of 60,000 volts, the depth of penetration amounts to 0.1 mm. and in the case of ultraviolet rays it is still greater. To fulfill the above condition particular measures are therefore necessary, inasmuch as only in the case of a very slight magnification, the depth of focus of microscope amounts to 0.1 mm. According to the invention the crystal screen is therefore rendered more or less fluorescent only in a thin surface layer (for instance, by the above-mentioned surface activation) or ground to such a thinness that its effective thickness amounts to $\frac{1}{100}$ mm. In this connection it must be pointed out that only the single crystal screen with its great spatial concentration of fluorescent substance within a zone of smallest thickness affords the desired high energetic efficacy. By the above-indicated values of thickness, efficiency of the fluorescence of such a screen is substantially the same as that of a screen whose effective thickness is equal to or greater than the depth of penetration, since the fluorescence is mainly caused by the rapid electrons not yet checked in the layer or by the ultraviolet light not yet weakened.

Quantitative data are indicated below to justify the above-required extremely thin screen thickness ($\leq 0.1$ mm.):

From geometrical considerations as to the depth of focus it follows that the resolving power of a sphalerite single crystal screen (refractive index $n'=2.3$) viewed under an aperture angle $\alpha$ and having a thickness $\Delta x$ may attain the following approximate value $$d=\frac{n}{n'}\cdot \sin \alpha . \Delta_x$$

During the emission of electrons there results, besides the limitation of the resolving power given by the above equation, a further reduction caused by the spatial electron dispersion in the crystal. In practice, the fuzziness caused by the spatial electron dispersion amounts approximately to 50% of the crystal thickness. For a crystal screen of a thickness of 0.02 mm. which may be obtained with the microsizes required there results also for electrons, the considerable resolving power of 0.01 mm.

This value is exactly of the same magnitude as the resolving power of the layers employed at present for photographically fixing the image.

The actual light density in a microscreen of the above-mentioned type is almost four orders of magnitude greater than with a large luminous screen for direct observation of the image. The image energy is distributed on screen surfaces of a few mm.$^2$ instead of on surfaces of, for instance, $10^4$ mm$^2$.

So long as the linear optical magnification in the light-optical adjusting microscope is not greater than that corresponding to the ratio between the aperture value of the adjusting microscope and the aperture value of the human eye (the order of magnitude of this magnification is 50 according to Fig. 1), this gain in light density obtained by the reduction of the image surface remains fully utilized.

By virtue of the great increase in surface brilliance in an arrangement according to the invention it is possible to fix the image by photographically recording with the aid of a light microscope the bright image appearing on the luminous screen. This method presents the following further advantages:

(1) An introduction of the photographic plate into the vacuum chamber is not necessary. The fixing of the image may be effected in a simple manner with the usual light-sensitive means.

(2) A considerable percentage of the total magnification is obtained by the light microscope so that the percentage of magnification to be obtained by the ultraviolet microscope or the electronic microscope is considerably reduced.

The invention may also be considered from another point of view.

As mentioned at the outset, the conditions of intensity play an important part in electronic microscopes. The most favorable magnification obtained by an electronic microscope as regards the conditions of intensity is according to the invention that for which the smallest distance perceivable by the electronic microscope is brought to such a value which is somewhat greater than the resolving power of the recording photographic layer or of the luminous screen. If when selecting the magnification this rule is followed, the quality of the image is not yet impaired by the image record, whereas the energy of the rays to be projected is concentrated on the smallest permissible surface. As a result, a particularly intense brilliance of the image, or particularly short photographic exposure times, or corresponding reserves of intensity which may be employed to improve the resolving power of the electronic microscope, may readily be obtained.

Since the luminous screen, as a rule does not only serve to effect a visual observation, but to also permit the focusing of the image, it is customary to arrange the luminous screen and the recording photographic layer in the same optical plane so as to be exchangeable for each other. For the same position of the projection plane and for the same resolving power of the photographic layer and the fluorescent screen obtained with the screen according to the invention, one and the same magnification of the image produced by the electron or ultraviolet microscope is the most favorable both for the visual observation and the photographic record.

What is claimed is:

1. In a microscopic apparatus having a luminescent screen, means for producing a magnified image on said screen, and light-optical magnifying means for observing said image, said screen consisting substantially of a ground and polished single crystal of activated zinc sulfide.

2. In a microscopic apparatus having a luminescent screen, means for producing a magnified image on said screen, light-optical magnifying means for observing said image, and means for accommodating a photographic layer, said latter means and said screen having their respective surfaces in the same optical plane when in operative position, and said screen consisting substantially of a ground and polished synthetic single crystal of phosphide of zinc sulfide.

3. In a microscopic apparatus having a luminescent screen, means for producing a magnified image on said screen, and light-optical magnifying means for observing said image, said screen consisting substantially of a ground and polished single crystal of activated zinc sulfide and having an effective thickness of its activated surface layer in the order of magnitude of 0.01 mm.

4. In a microscopic apparatus having a luminescent screen, means for producing a magnified image on said screen, and light-optical magnifying means for observing said image, said screen consisting substantially of a ground and polished single crystal, and the magnification factor of the microscopic apparatus being approximately equal to the ratio between the resolving power of said screen and the resolving power of the microscopic apparatus.

5. In a microscopic apparatus having a luminescent screen, means for producing a magnified image on said screen, light-optical magnifying means for observing said image, and photographic means for recording the image, said photographic means and said screen having their respective surfaces in the same optical plane when in operation, said screen consisting substantially of a ground and polished single crystal of activated zinc sulfide and having a resolving power in the order of magnitude of the resolving power of said photographic means, and the magnification factor of the microscopic apparatus being in the order of magnitude of the ratio between said resolving power of said screen and the resolving power of the microscopic apparatus.

6. In a microscopic apparatus having a luminescent screen, means for producing a magnified image on said screen, and light-optical magnifying means for observing said image, said screen comprising a center portion consisting of a ground and polished single crystal of activated zinc sulfide and an outer portion consisting of multi-crystal line substance.

7. In a microscopic apparatus having a luminescent screen, means for producing a magnified image on said screen, and light-optical magnifying means for observing said image, said screen consisting substantially of a ground and polished single crystal of zinc sulfide of thickness in the order of magnitude of at most 0.1 mm. and having a fluorescent surface layer containing metallic substance, said surface layer having an effective thickness amounting to a small fraction of said crystal thickness.

8. In a microscopic apparatus with two microscopic ray systems of different resolving power for rays of different wave length respectively, said two systems having the optical axis and an optical plane in common for producing differently magnified images of a single object to be studied, a composite microscope element arranged in said common plane and having a center portion and a surrounding portion of different structure, said center portion being associated with only one of said microscope systems and forming an optically-operative part thereof, and said surrounding portion being associated with said other microscope system and forming an optically-operative part of the latter system.

9. In an optical apparatus for invisible rays of shorter wave length than visible light having a screen for producing a visible image, said screen consisting of a ground and polished single crystal of phosphide of zinc sulphide.

10. In an optical apparatus for invisible rays of shorter wave length than visible light having a screen for producing a visible image, said screen consisting of a ground and polished single crystal of phosphide of zinc cadmium sulphide.

MANFRED von ARDENNE.